J. M. LEWIS.
PNEUMATIC CUSHION BOLSTER FOR VEHICLES.
APPLICATION FILED JUNE 4, 1913.
1,108,768.  Patented Aug. 25, 1914.
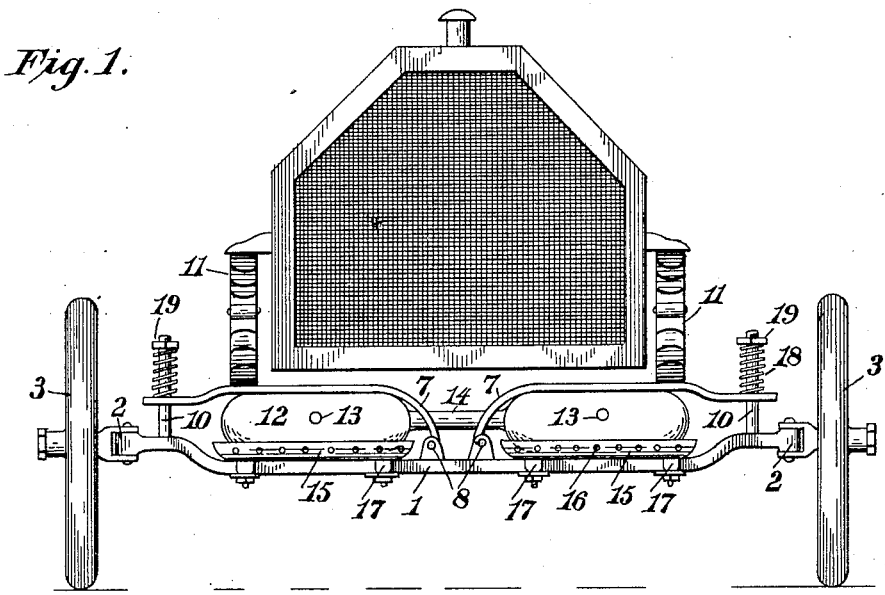
Fig. 1.
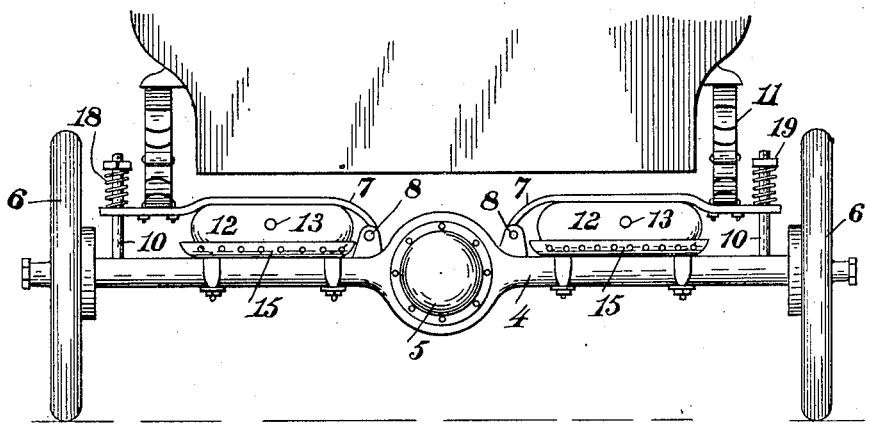
Fig. 2.
Fig. 3.
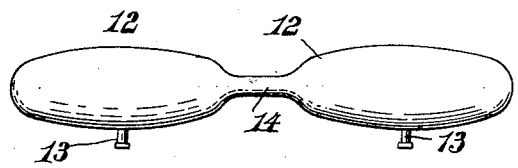
Inventor
Joseph M. Lewis.
Witnesses
Geo. E. Frech.
R. M. Smith.
By Victor J. Evans
Attorney

UNITED STATES PATENT OFFICE.

JOSEPH M. LEWIS, OF TRENTON, NEW JERSEY.

PNEUMATIC-CUSHION BOLSTER FOR VEHICLES.

1,108,768.   Specification of Letters Patent.   Patented Aug. 25, 1914.

Aplication filed June 4, 1913. Serial No. 771,694.

*To all whom it may concern:*

Be it known that I, JOSEPH M. LEWIS, a citizen of the United States, residing at Trenton, in the county of Mercer and State of New Jersey, have invented new and useful Improvements in Pneumatic-Cushion Bolsters for Vehicles, of which the following is a specification.

This invention relates to pneumatic cushion bolsters for vehicles of all descriptions, the invention, however, being especially designed with reference to automobiles, the object in view being to provide a novel and efficient construction of supporting bolster between the axle and body of a vehicle, whereby the jars and vibrations imparted to the wheels of the vehicle are absorbed primarily by the axle and prevented from being transmitted to the body of the vehicle and to the body supporting springs.

A further object of the invention is to provide in connection with a pneumatic bolster, means for checking or taking up the rebound of the vehicle body thereby materially assisting the pneumatic bolster and imparting increased efficiency thereto.

With the above and other objects in view, the invention consists in the construction, combination and arrangement of parts, as will hereinafter be more fully described, illustrated and claimed.

In the accompanying drawings:—Figure 1 is a front elevation of an automobile showing the pneumatic cushion bolster of this invention applied to the front axle. Fig. 2 is a rear elevation of the rear axle showing the invention applied thereto. Fig. 3 is a plan view of one of the pneumatic cushions shown in Fig. 1.

Referring to the drawings 1 designates the front axle of an automobile, said axle being provided at its opposite ends with the usual steering knuckles 2 and the wheels 3 journaled on said knuckles, the knuckles being adapted to permit the wheels 3 to be turned for steering the machine, all of said parts being of the usual construction and arrangement.

4 designates the rear axle or rear axle housing embodying the centrally arranged differential housing or casing 5 and the driving wheels 6. As the pneumatic cushion bolster of this invention is applied both to the front and rear axles of the machine and as the same construction of the bolster is employed in both cases, a description of one of the bolsters will be sufficient for both.

As illustrated in Figs. 1 and 2, each bolster comprises a pair of oppositely extending bolster sections 7 hinged at their inner ends as shown at 8 to the axle in conjunction with which they are used. Each of the bolster sections 7 curves longitudinally from its inner toward its outer end and the outer end thereof is left free with respect to the axle to which the inner end is hinged.

At its outer end each bolster section 7 is provided with an elongated hole or slot through which passes an upstanding guide post 10 carried by the end portion of the axle and having a fixed relation thereto, said post 10 being designed to steady and guide the up and down movements of the outer end of the bolster section 7, keeping said bolster section in vertical alinement with the axle to which it is hingedly connected.

The body supporting springs 11 arranged at opposite sides of the machine frame or chassis are fastened to the bolster sections 7 adjacent to the outer ends of the latter and near the guide posts 10 so that the weight of the body and load is carried by the vertically movable outer end portions of said bolster sections.

Between the bolster sections 7 and the under-lying axle are interposed pneumatic cushions 12, two of said cushions being shown and each of said cushions being illustrated as provided with an inflating valve 13 adapted to have a suitable air pump connected thereto. If desired the cushions 12 may be connected by means of a flexible tube 14 as shown in Figs. 1 and 3, in which case only one of the inflating valves 13 will be required.

In order to properly support the cushions 12, saddles 15 are secured to the axle just under the cushions, each of said saddles being preferably perforated as shown at 16 to reduce the weight thereof and each saddle being provided with a plurality of axle embracing clips 17 thus providing for fastening the saddles securely to the axle.

The guides posts 10 are extended sufficiently above the bolster sections 7 to receive check springs 18 shown in the form of coil springs which surround the upper portions of the posts 10 above the bolster sections 7, said springs bearing at one end against the bolster sections and being held in place on the posts 10 by means of nuts 19 or the equivalent thereof. The springs 18 serve to check the upward movement or rebound of the bolster sections and the body of the vehicle and add materially to the comfortable riding qualities of the machine.

In the preferred embodiment of the invention the bolster sections 7 are made of spring steel so as to render the same elastic. This also adds materially to the comfortable riding qualities of the machine and distributes the weight more evenly upon the pneumatic cushions 12. In a great many cases the pneumatic cushion bolster hereinabove described will render the use of the ordinary pneumatic tires unnecessary and will also add greatly to the life and durability of the machine as a whole, reducing the cost of up-keep of the machine in addition to adding to the comfort of the passengers. Should one of the cushions become ineffective by reason of injury thereto or a leak therein, a block or wedge may be placed under the spring bolster affected thus permitting the machine to be driven to a place where it may be repaired, without affecting the body supporting springs 11.

From the foregoing description it will be seen that the jars and vibrations to which the wheels 3 and 6 are subjected are absorbed at once by the pneumatic cushions 12 assisted by the spring bolster sections 7. Therefore most of the vibration is taken up before reaching the ordinary body supporting springs 11. Therefore very little of the vibration reaches the frame or chassis and body of the machine.

What is claimed is:—

1. A pneumatic cushion bolster for vehicles, involving the combination of a vehicle axle, a body supporting bolster embodying separate and independent sections each hinged at its inner end to the central portion of said axle and having its outer end slotted, guide posts on said axle passing through the slots of the bolster sections and on which the outer ends of said sections slide up and down, pneumatic cushions interposed between said axle and the bolster sections, and an independent check spring for each of said sections encircling one of said posts.

2. A pneumatic cushion bolster for vehicles, involving the combination of a vehicle axle, a body supporting bolster embodying a pair of separate and independent sections each consisting of a spring metal strap hinged at its inner end to the central portion of said axle and having its outer end slotted, guide posts on said axle passing through the slots on the bolster sections and on which the outer ends of said sections slide up and down, and pneumatic cushions interposed between said axle and the spring bolster sections.

In testimony whereof I affix my signature in presence of two witnesses.

JOSEPH M. LEWIS.

Witnesses:
GEORGE M. HOWELL,
LEON H. SEELY.